United States Patent [19]
Laing

[11] 3,894,395
[45] July 15, 1975

[54] THERMAL POWER PLANT

[76] Inventor: Nikolaus Laing, Hofener Weg 35-37, 7141 Aldingen near Stuttgart, Germany

[22] Filed: Sept. 12, 1973

[21] Appl. No.: 396,520

Related U.S. Application Data

[63] Continuation-in-part of Ser. No. 383,537, July 30, 1973, which is a continuation of Ser. No. 152,946, June 14, 1971, abandoned.

[52] U.S. Cl. .............. 60/652; 60/659; 60/669; 122/11; 122/400; 165/86; 165/104
[51] Int. Cl. .................. F01k 13/02; F01k 3/00
[58] Field of Search ........ 60/652, 659, 669; 122/11, 122/400; 165/86, 104

[56] References Cited
UNITED STATES PATENTS

| | | | |
|---|---|---|---|
| 784,005 | 2/1905 | Ketchum | 60/26 |
| 2,467,092 | 4/1949 | Ostermann | 60/105 |
| 2,544,474 | 3/1951 | Swanton, Jr. | 60/26 |
| 3,409,782 | 11/1968 | Bronicki | 60/105 X |
| 3,488,961 | 1/1970 | Gerber | 60/105 |
| 3,613,368 | 10/1971 | Doerner | 60/108 R |
| 3,643,437 | 2/1972 | Birnbaum et al. | 60/105 X |

Primary Examiner—Martin P. Schwadron
Assistant Examiner—H. Burks, Sr.
Attorney, Agent, or Firm—Karl F. Ross; Herbert Dubno

[57] ABSTRACT

A drive shaft for the traction wheels of an automotive vehicle is powered by an engine which is traversed by a vaporized working fluid passing in a closed circuit from the engine through a rotary condenser and thence through a rotary evaporator mounted for joint rotation about a common axis. The engine power is magnetically transmitted to the shaft through a low-reluctance wall portion of a housing rotating with the evaporator and the condenser to provide a hermetically sealed enclosure for the working fluid. The rotary evaporator impels an external heat carrier constituted either by the combustion gases of a burner of liquid fuel or by an air current heated directly or indirectly from a store of latent heat. The burner is switched on for driving in open country and, besides powering the engine, charges the latent-heat store; in congested city traffic, the burner is switched off and the energy is supplied by the heat store. Under overload conditions, the heat store and the burner are connected in tandem to supply extra energy to the evaporator.

49 Claims, 18 Drawing Figures

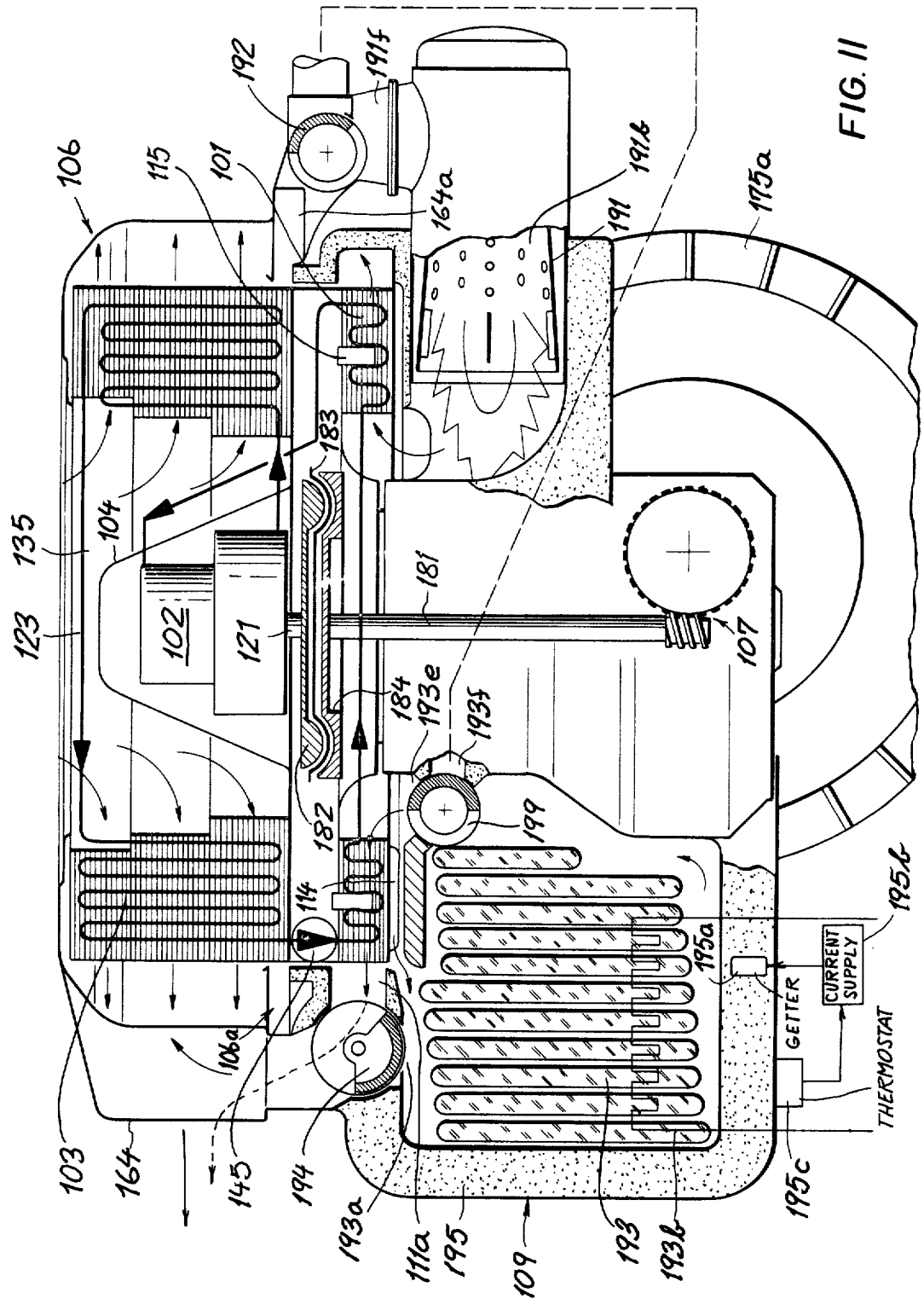

THERMAL POWER PLANT

REFERENCE TO RELATED APPLICATIONS

This application is a continuation-in-part of my pending application Ser. No. 383,537 filed 30 July 1973 as a continuation of my prior application Ser. No. 152,946 which was filed on 14 June 1971 and is now abandoned. The present application also discloses subject matter of my copending application Ser. No. 84,097 now U.S. Pat. No. 3,811,495 filed 26 Oct. 1970.

FIELD OF THE INVENTION

The present invention relates to a thermal power plant serving as a prime mover for a load such as the traction wheels of an automotive vehicle. It has, however, more general utility in the field of converting thermal energy into motive power.

BACKGROUND OF THE INVENTION

The conventional internal-combustion engine, used heretofore almost exclusively in automotive vehicles, is one of the major contributors to the pollution of the environment, especially in urban centers of high traffic density. This is due to the fact that the extremely brief ignition period does not allow complete combustion of the air/fuel mixture so that the exhaust gases are rich in toxic constituents such as carbon monoxide. Another drawback of such engines is the noise due to their intermittent mode of operation, particularly in the case of motors running close to their rated capacity. This problem is aggravated by the current tendency to lower fuel consumption through reduction of the power ratings of automotive engines.

OBJECTS OF THE INVENTION

An important object of my present invention is to provide a power plant of the external-combustion type avoiding the aforestated disadvantages of internal-combustion engines.

A related object is to provide means in such a power plant for operating same with optimal efficiency under widely varying load conditions.

Another object of my invention is to provide means for avoiding leakages of working fluid in an engine operating according to some variant of the Carnot cycle, such as the Rankline or the Stirling cycle, in which this fluid travels in a closed circuit through zones of different temperatures and pressures.

A further object is to provide a plant of this nature whose operation entirely avoids the emission of combustion gases in areas (e.g., in congested traffic or on passage through a vehicular tunnel) in which such emission would be extremely undesirable.

Still another object is to provide means in such a power plant making available additional energy for uphill driving or similar high-load conditions overtaxing the normal capacity of the external-combustion engine.

Yet a further object, allied with the preceding one, is to provide means for supplementing even this additional energy with short-term energy spurts as may be required in exceptional instances, as for overtaking another vehicle on the upgrade.

Other objects of my invention are to improve the performance of a burner forming part of such a power plant, to increase the efficiency of an evaporator thereof for quick starts, to facilitate the circulation of a relatively high-boiling lubricant such as oil in the circuit of the working fluid, and to optimize the disposition of such a power plant in the body of an automotive vehicle.

SUMMARY OF THE INVENTION

A power plant according to my invention, designed to satisfy the aforestated desiderata, comprises heat-exchanger means fluidically linked with the engine through a first conduit system serving to conduct the working fluid in a closed circuit. A second conduit system conducts an external heat carrier, generally air or hot combustion gases, through the heat-exchanger means in thermally interacting relationship with the working fluid whereby the latter absorbs heat from the carrier upstream of the engine and give up heat to the environment downstream of the engine. The carrier can be heated, prior to entry into the heat-exchanger means, under the control of switchover means, such as a set of valves, by combustion means such as a burner of liquid hydrocarbon fuel; in an inoperative stage of the combustion means the necessary thermal energy is obtained from a storage unit which advantageously can be recharged by the heat of the combustion gases in the operative stage of the burner.

Thus, in a first switching position the burner is turned on to energize an upstream section of the heat-exchanger means which acts as an evaporator if the working fluid is of the vaporizable kind. Suitable working fluids include low-boiling metals such as cesium, sodium and potassium; the heavier Freon-type compounds, with boiling points well above ambient temperature, may also be used. In a second switching position, the burner is cut off and thermal energy is extracted from the heat store which may have been recharged before the start of operation and which advantageously is provided with electric heating means for this purpose. In localities in which electric rates are lower at certain periods (e.g., at night) such charging could be carried out during a low-rate period.

Efficient operation requires that the heat be stored in latent form. For this purpose the storage unit comprises a reservoir or accumulator containing a mass of a thermally fusible material having freezing and melting points (not necessarily coincident) above the boiling point of the working fluid in order to be able to maintain the heat carrier at a temperature sufficient to vaporize that fluid. Suitable materials, preferably crystalline compounds with ionic or covalent bonds, include various lithium compounds such as lithium hydride, hydroxide or fluoride as well as eutectic mixture of lithium salts with salts of other metals.

In order to avoid any possible leakage of working fluid, another feature of my invention resides in the provision of a hermetic enclosure for the aforementioned first conduit system. Since that system carries the working fluid through the frame of the engine, the latter will have to be mounted within that enclosure.

Thus, the output energy of the engine must be delivered to the load through the enclosure which for this purpose may have a low-reluctance wall portion pervious to magnetic flux; it should be understood, however, that this wall portion must not be magnetically permeable (in the sense in which this term is applied to ferromagnetic materials) so as not to constitute a magnetic shunt for flux generated either inside or outside the enclosure. The motor of the engine may be operatively coupled in this manner with an external transmission by magnetic means, either by direct attraction between an array of magnet poles and a confronting armature or through the magnetic excitation of the windings of an electric generator. Alternatively, the intervening wall portion may be physically deformable to permit energy transmission by mechanically coacting elements.

As described in detail hereinafter, the hermetic enclosure is preferably designed as a rotatable housing rigid with both the evaporator section and the condenser section of the heat-exchanger means which are centered on a common axis of rotation and are constructed as radial blowers in order to impel the external heat carrier and the cooling air. The rotary unit consisting of the evaporator, the condenser and the housing is rigid with the stator or frame of the engine which is subjected to a reaction force from the working fluid acting upon the engine rotor or output shaft. With the mass of this rotating unit generally much larger than the effective mass of the load coupled to the engine shaft through a stepdown transmission, its speed of rotation will normally be substantially lower than that of the counterrotating shaft. Nevertheless, the two blowers will be traversed by enough air (or other gaseous heat carrier) to vaporize and recondense the working fluid in a Rankine cycle. Reference in this connection may be made to my copending application Ser. No. 286,569, filed 5 Sept. 1972, which teaches the centrifugal displacement of a fluid between annular fins physically interconnecting a rotating array of axially extending tubes of a blower-type heat exchanger, the tubes being disposed substantially along segments of an Archimedean spiral whose pitch is so correlated with the rotary speed as to minimize any reaction thereof upon the fluid flow.

In accordance with another important feature of my invention, the burner in its operative stage (i.e., in the first switching position referred to above) has an air inlet connected to a discharge duct of the rotating condenser in order to receive the preheated air exiting therefrom. In a third switching position, to be used under conditions of increased load, the air inlet of the burner is disconnected from the discharge duct of the condenser and is connected instead to the latent-heat store whereby combustion air for the burner is raised to a high temperature just before reaching the burner. This burner, according to still another feature of my invention, is provided with a vortex chamber having a centrally positioned primary air inlet and one or more secondary air inlets, the latter being provided with twist-imparting means such as vanes for injecting a swirling air flow into the chamber in a direction skew to its axis, thereby setting up a toroidal flow centered on that axis and rotating around same as well about its own centerline. Atomized fuel is injected into the chamber by a nozzle in the form of a substantially conical spray centered on the axis, the generatrices of the cone passing through the toroidal flow in the vicinity of its centerline whereby the fuel particles are intimately mixed with the air for rapid and complete combustion.

A burner of this type is only limitedly adjustable in its thermal output if the necessary stoichiometric relationship between the fuel and the admixed air is to be maintained in the interest of clean combustion. In order to accommodate a wide range of varying loads, therefore, another important feature of my invention provides for an intermittent operation of the burner under the control of a programmer which periodically reverses the switchover means in a load-dependent rhythm. With maximum load under normal operating conditions and with no restrictions placed on the emission of the exhaust fumes, as during open-country uphill driving, combustion is continuous; when the load is reduced, thus upon cruising on a level road or on a downgrade, the burner is cut off for shorter or longer intervals during which the storage unit supplies the necessary vaporization heat. In this way, for example, a frictional load of one-third the nominal or maximum load can be handled by operating the burner for one-third of a cycle, with simultaneous recharging of the heat store, and deactivating the burner during the remaining two-thirds. During its operating interval, which in any case is substantially longer than the combustion phase of the conventional Otto cycle, generation of harmful combustion products such as carbon monoxide and nitrogen oxides is minimized. The ratio of maximum to minimum load may be as high as 20 : 1.

Compared with the usual lead accumulator, the energy-storing capacity of my latent-heat store per unit of weight is about twenty times as high. Even when conversion and leakage losses are taken into account, its effective storage capacity may still be considered about six to nine times as high as that of the lead accumulator.

BRIEF DESCRIPTION OF THE DRAWINGS

The above and other features of my invention will now be described in detail with reference to the accompanying drawing in which:

FIG. 11 is a view generally similar to FIG. 9, illustrating a modified power plant according to my invention in a first operating position;

SPECIFIC DESCRIPTION

Figure 1:
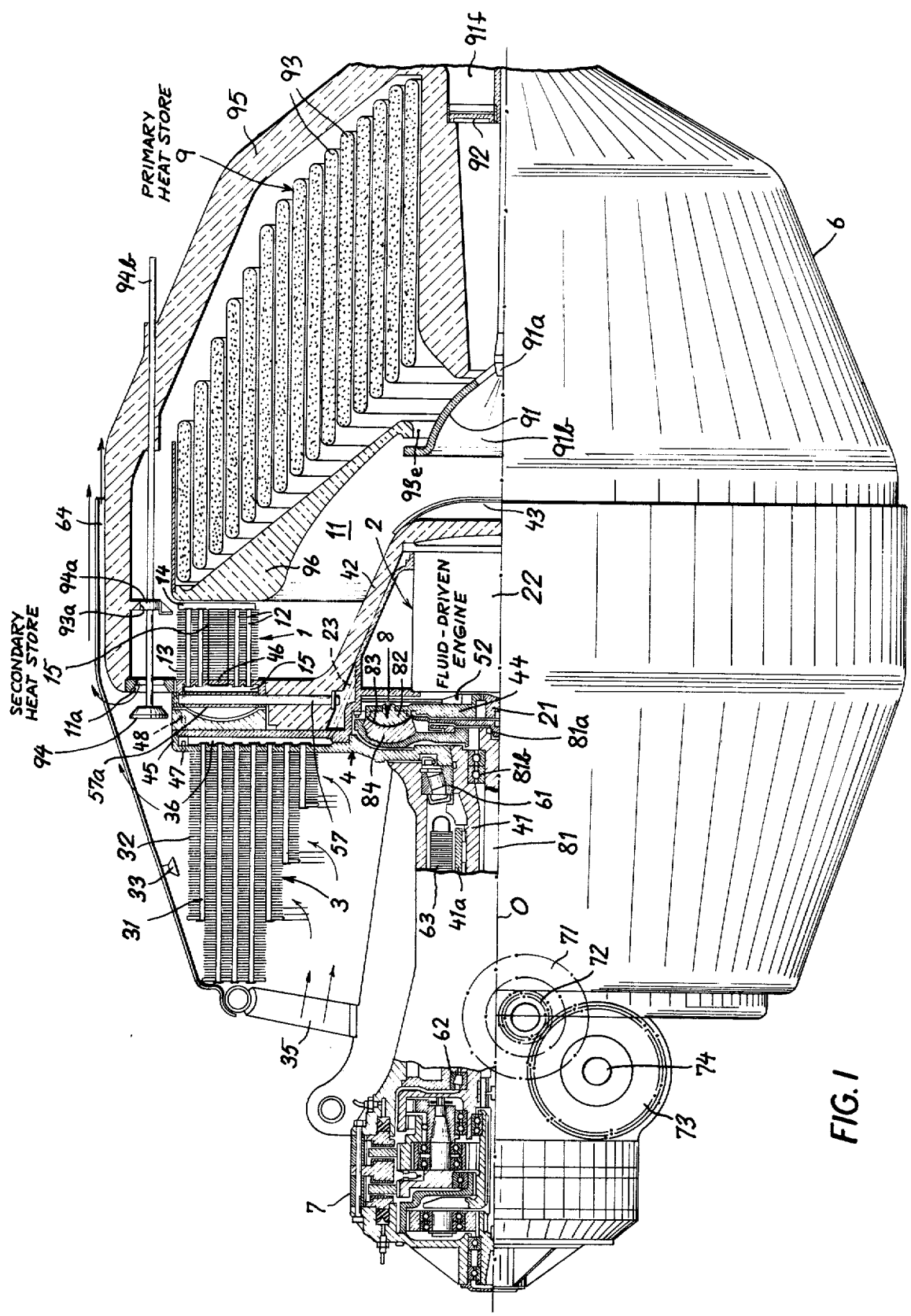
FIG. 1 is a side-elevational view, partly in axial section, of a power plant embodying my invention.
Figure 2:
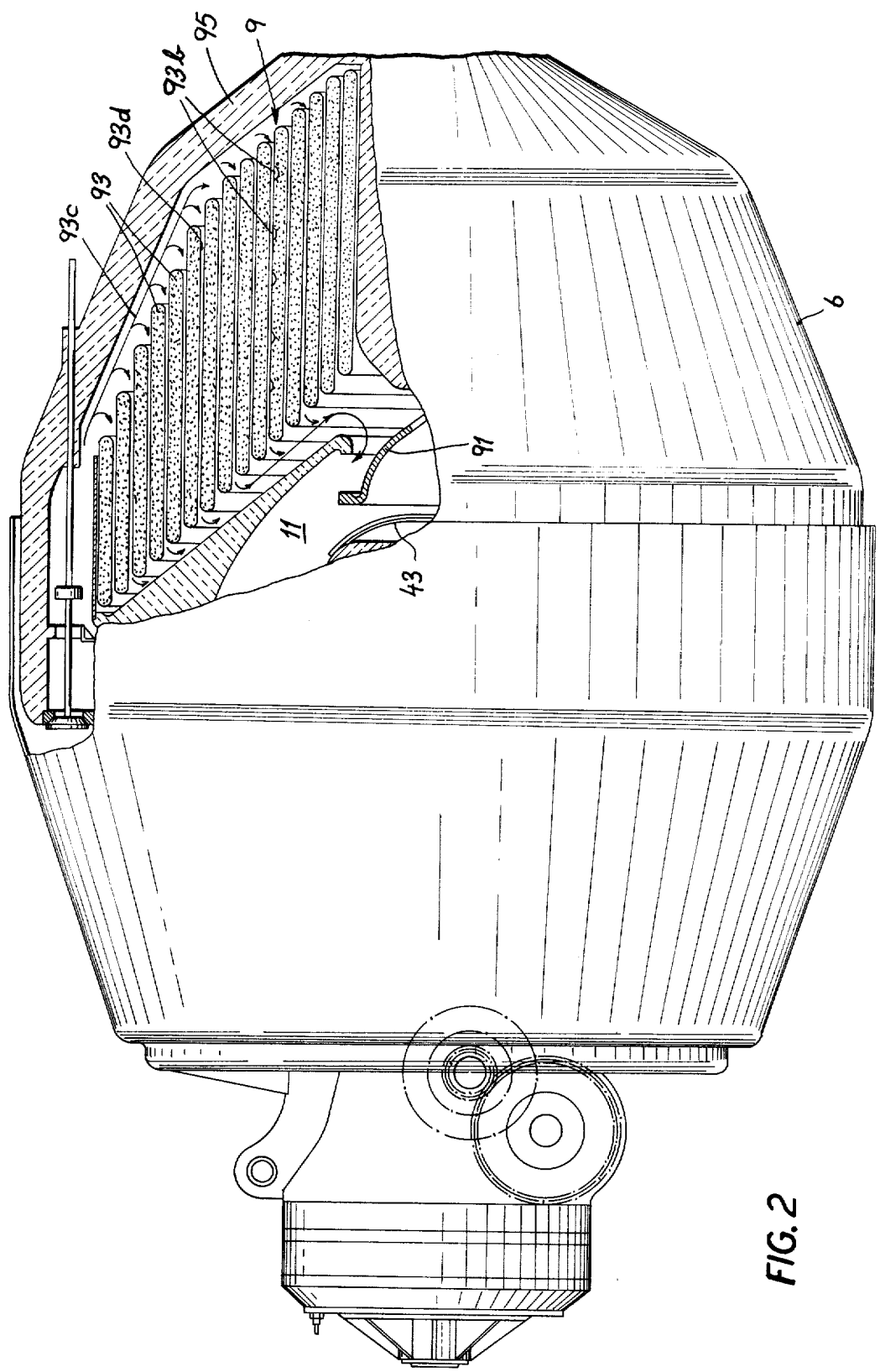
FIG. 2 is a view similar to FIG. 1, illustrating a different operating position.

In FIGS. 1 and 2, I have shown a power plant according to the invention comprising two rotary heat exchangers 1 and 3 centered on a common axis 0, heat exchanger 1 serving as an evaporator and heat exchanger 3 serving as a condenser for a working fluid traveling in a closed circuit through these heat exchangers and through an engine 2 operated by fluid pressure. Component 2 may be a turbine, a Wankel motor or any other fluid-driven engine having a frame 22 and an output shaft 21, the latter being journaled in a transverse wall 44 of a housing 4 which is centered on axis O and has a tubular shaft 41 journaled via bearings 61, 62 in a stationary outer casing 6. An electromagnetic winding 63, mounted on shaft 41 through the intermediary of a ring 41a, forms part of a starting motor which can be energized at the beginning of operations to set the unit 1 – 4 in rotation about axis O.

Housing 4 hermetically seals the flow path of the circulating working fluid against the atmosphere. This flow path includes a conduit 23 for spent vapor leaving the engine 2, the vapor passing into an annular manifold or header 36 behind a housing wall 47 which carries an annular array of axially extending tubes 31 forming part of the condenser 3; the tubes 31 communicate at one end with the manifold 34 and are closed at their other end. Condensate collecting in a trough at the periphery of the manifold 36 is fed by a pump 45 via a connection 48 to a similar manifold or header 16 behind an annular housing wall 46 from which an annular array of tube 12, forming part of evaporator 1, extend in the opposite axial direction; these latter tubes communicate at one end with manifold 16 and are likewise closed at the opposite end. The fluidic circuit is completed by a nonillustrated conduit returning the expanding vapors to the engine 2 from the manifold 16.

The need for a condensate pump can be avoided through utilization of the thermosiphon principle if the connection 48 between the two heat exchangers is relocated from the periphery of the housing to the vicinity of its axis and if the outer radius of condenser 3 is made less than that of evaporator 1 so that the condensate leaving the tubes 31 is drawn radially inwardly against a centrifugal force less than that which propels the same condensate radially outwardly toward the tubes 12. Such a thermosiphon-type heat-exchanger assembly has been more fully described and illustrated in my copending application Ser. No. 286,569 filed 5 Sept. 1972.

Figure 4:
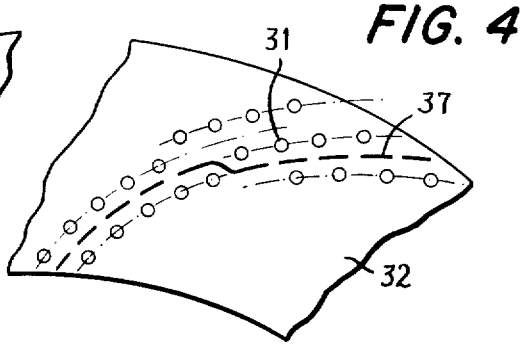
FIG. 4 is a similar fragmentary view of a rotary condensing heat exchanger forming part of the system.

The evaporator tubes 12 and the condenser tubes 31, consisting of highly heat-conductive metal, are interconnected by respective sets of annular ribs 13 and 32 of similar metal which are centered on the axis O and lie in transverse planes closely spaced from one another. Air or other gas present between these ribs is frictionally entrained around the axis so as to be subjected to a centrifugal force; the resulting radially outward flow drives the individual gas particles along trajectories in the form of Archimedean spiral. Thus, if the tubes are disposed along similar spiral curves 37 as illustrated in FIG. 4 for the tubes 32 of heat exchanger 3, their presence does not give rise to any shear forces tending to retard or accelerate the flow. This conforms to the reactionless arrangement disclosed and claimed in my aforementioned copending application Ser. No. 286,569.

Furthermore, as also particularly illustrated for the condensing heat exchanger 3, the tubes may be staggered in length so that the radially innermost tubes terminate nearer their manifold or header than the outlying tubes. In conformity therewith, the radial width of the ribs decreases in the direction away from housing 4. This staggering exposes the more outlying tubes to a more immediate thermal interaction with the oncoming air flow. In order to provide a substantially uniform ratio of mass flow to effective surface area, the axial spacing of the ribs is preferably greatest in the vicinity of the housing 4, where their surface is largest, and progressively diminishes as the inner radii of the ribs increase. This arrangement has been disclosed and claimed in my aforementioned application Ser. No. 84,097.

The tubes and the ribs may consist of aluminum or an aluminum alloy, e.g., with a core containing 3% magnesium and with a lower-melting surface layer containing 10% magnesium to facilitate the soldering of the tubes to the ribs and to the housing 4.

Engine shaft 21 carries a rotor 82 which forms an annular array of magnetic poles confronting a similar array 84 on a drive shaft 81 whose end proximal to engine 2 is supported on motor shaft 21 through bearings 81a and is also journaled in shaft 41 via bearings 81b. The opposite end of shaft 81 is connected with a planetary-gear transmission 7 which, by way of a bevel gear 71 and spur gears 72, 73, drives a shaft 74 coupled (e.g., through a differential gearing) with the traction wheels of an automotive vehicle powered by the system of FIGS. 1 and 2.

The pole rings 82 and 84, of which at least one should be permanently magnetized, form part of a magnetic coupling generally designated 8. The magnetic flux interlinking these pole rings passes through a wall portion 83 of housing 4 which offers a low reluctance to the flux thereacross and which may therefore be described as magnetically pervious.

The stationary part of the assembly of FIGS. 1 and 2 comprises a primary heat store of accumulator of thermal energy 9 here shown to consist of a set of flat annular containers 93, centered on axis O, which are filled with a flexible compound as described above and which are held slightly separated, by means of nonillustrated spacers, to form passages 93d for a gaseous heat carrier such as air. The heat store 9 is enclosed by thermally insulating walls 95 and 96 which define an entrance port 93a and an annular exit gap 93e. The two passages 93a and 93e open into a generally bell-shaped channel 11 bounded by the insulating wall 96 and by a similar insulating layer 42 on housing 4; a central radiation reflector 43, mounted on the housing, confronts a burner head 91 to which a hydrocarbon fuel such as gasoline or Diesel oil is admitted via an axially disposed nozzle 91a. An air inlet 91f can be partially throttled or fully blocked by a valve 92. Most of the air passing the valve 92 enters a combustion chamber 91b within burner head 91, and the adjoining space 11, around the nozzle 91a; a fraction of this air stream, which can be regulated by an axial shifting of burner head 91, can bypass the combustion chamber and enter the space 11 directly.

The aspiration of the combustion air via inlet 91f is effected by the rotation of evaporating heat exchanger 1 which also carries a set of impeller blades 14 deviating some of that air into the heat store 9 even in the position of FIG. 1 in which the entrance port 93a is closed by a plug 94a on a stem 94b of a valve 94. The latter valve confronts a port 11a through which exhaust gases space 11 can escape into the atmosphere via an outlet 64 of casing 6. The same outlet serves for the discharge of spent cooling air which enters the casing at an intake port 35 and traverses the condensing heat exchanger 3.

The containers 93 of heat store 9 are provided with grooves accommodating electric resistance heaters 93b which may be energized in advance to percharge the storage unit, i.e., to melt the fusible substance in these receptacles. The superinsulation of walls 95 and 96 minimizes heat losses or standstill. In operation, with the system in the position of FIG. 1 and with the air/fuel mixture ignited by a single energization of a nonillustrated spark plug, the working fluid in tubes 12 is vaporized by the heated combustion gases from channel 11; a small part of these gases, bypassing the evaporator 1 so as not to undergo any appreciable cooling, is directed by the vanes 14 into the store 9 through which it circulates, re-entering the channel 11 through the partly obstructed gap 93e. This circulating air stream mingles with the fresh combustion gases and does not abstract any heat therefrom once the store 9 has been fully charged.

In the alternate position of FIG. 2, exhaust port 11a is blocked by the valve 94 while the entrance port 93a of heat store 9 is open. The exit 93e of this store is opened wide by the leftward shift of burner head 91; the air supply to the burner is cut off at 92, along with the fuel supply to nozzle 91a. Evaporator 1 and fan blades 14 now circulates the entire air volume of channel 11 through the passages 93d, as indicated by arrows 93c, to extract from containers 93 the thermal energy necessary for vaporizing the working fluid traversing the engine 2. When conditions permit, and of course whenever a depletion of the heat store so requires, the burner 91, 91a is reactivated with restoration of the position of FIG. 1.

The switchover between the positions of FIGS. 1 and 2 can be carried out under the direct manual control of the driver, or with the aid of a programmer as subsequently described with reference to FIGS. 11 – 14. As likewise shown in those Figures, there may be a third switching position in which the heat store 9 and the burner 91, 91a are connected to tandem so that the air entering the combustion chamber 91a is preheated for an approximately 50% higher yield of thermal energy without disturbing the stoichiometric balance existing in the wide-open position of valve 92. Furthermore, the programmer may be made effective to alternate between the positions of FIGS. 1 and 2 (with reignition of the air/fuel mixture upon any return to the fuel-burning position of FIG. 1) under conditions of partial loading, as explained above, in which case the valve 92 no longer operates as an adjustable throttle but merely has an on/off function.

Figure 3:
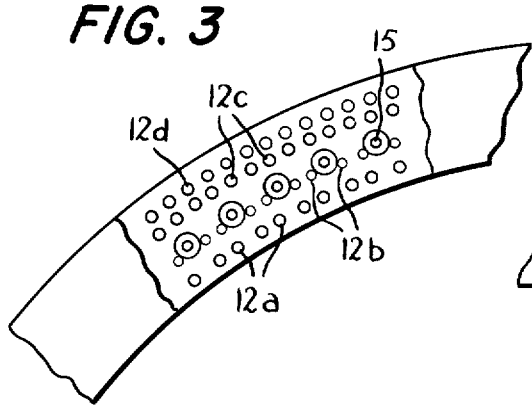
FIG. 3 is a fragmentary face view, partly in section, of a rotary evaporating heat exchanger included in the system of FIGS. 1 and 2.
Figure 5:
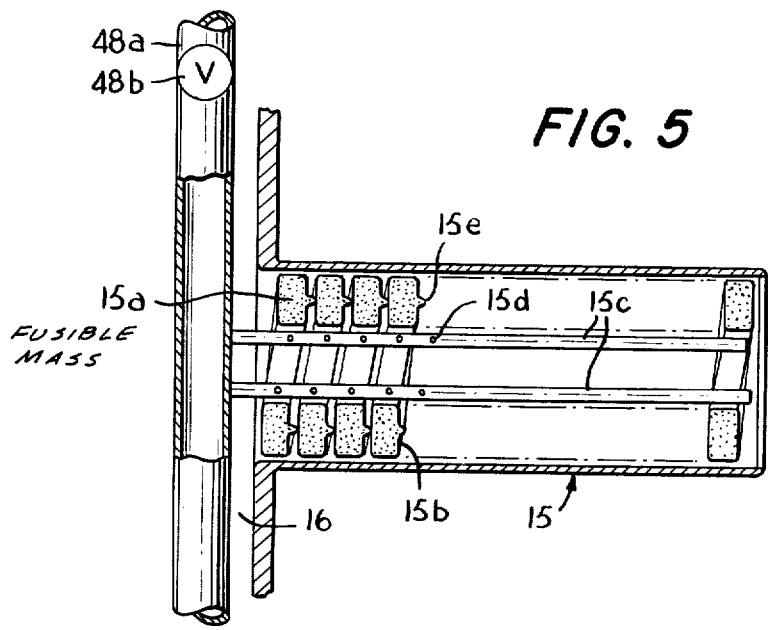
FIG. 5 is an enlarged longitudinal sectional view of a secondary heat store included in the evaporator of FIG. 3.

In the case of extraordinary demand, the supply of thermal energy may be temporarily increased by activating a secondary heat store in the form of several cylindrical receptacles 15 (see also FIG. 3) in evaporator 1. These receptacles, as illustrated in FIG. 5, contain a fusible mass 15a such as lithium hydride which freezes at a temperature above the boiling point of the working fluid. Thus, the same 15a is normally kept liquid by the hot combustion gases traversing the evaporator 1, available to vaporize additional working-fluid condensate branched off the connection 48 by a branch 48a including a normally closed valve 48b. Opening the valve 48b admits condensate to the interior of each receptacle 15 via a pair of parallel tubes 15c provided with perforations 15d. The receptacle, which consists of highly heat-conductive material, contains a set of annular vessels 15b filled with the fusible mass 15a, these vessels surrounding the tubes 15c and being held slightly spaced apart by axial projections 15e; in the embodiment shown in FIG. 5, the vessels 15b form the turns of a continuous helix. As the mass 15a congeals, its latent heat is given up to the working fluid which vaporizes and mingles in manifold 16 with the vapors coming from the evaporator tubes 12. As indicated in FIG. 3, the receptacles 15 are advantageously disposed at some intermediate location within the bank of tubes 12, as between two inner arrays 12a, 12b and two outer annular arrays 12c, 12d, in order to be shielded from immediate contact with the oncoming hot gases by the more inwardly disposed tubes; on the other hand, they should be disposed close enough to the heat source to be contacted by these gases while their temperature is still above the melting point of the mass 15a.

If the material of the primary heat store 9 has a freezing point higher than that of the compound 15a, the latter can also be utilized as a reserve source of thermal energy if the system operates in the position of FIG. 2, i.e., if the containers 93 act as the principal heat supply.

Figure 6:
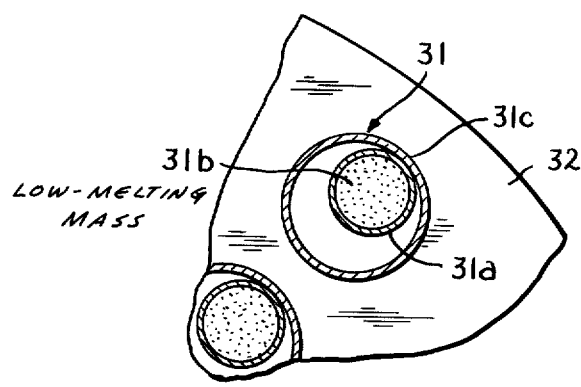
FIG. 6 is an enlarged cross-sectional view of a tube forming part of the condenser of FIG. 4.

Any overheating of the condenser air escaping via port 64 during periods of temporary overload can be prevented by installing ancillary heat sinks in its flow path, advantageously within some of all the tubes 31 of heat exchanger 3 as illustrated in FIG. 6. Thus, cylinders 31a filled with a normally solid fusible material 31b of relatively low melting point can be disposed in these tubes so as to be in good thermal contact therewith at 31c; the material 31b may be a hydrated metal salt such as, for example, trisodiumphosphatedodecahydrate or bariumhydroxioctahydrate. Upon discontinuance of the additional heat supply this material resolidifies. The provision of such ancillary heat sinks is less important, and may be dispensed with entirely, if a part of the condenser air is returned to the burner as preheated combustion air, as described below with reference to FIG. 11.

Instead of the ancillary heat sinks 31a, 31b, or in addition, I may also provide means for irrigating the ribs 32 of rotating condenser 3 in order to hold down the temperature of the flow of spent cooling air issuing therefrom. To this end the housing 6 may carry one or more spray heads 33, only one shown, to which water may be admitted (manually or under thermostatic control) via a nonillustrated valve whenever the air temperature rises above a certain point.

Figure 7:
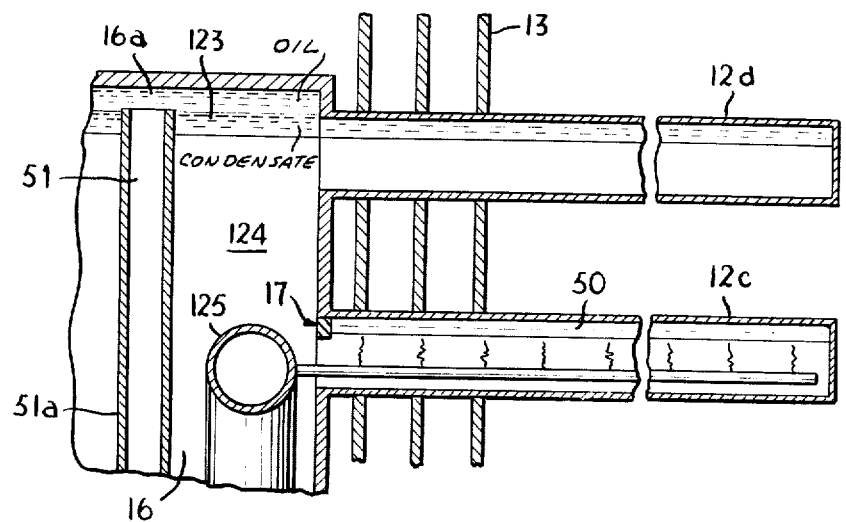
FIG. 7 is a view generally similar to FIG. 5, showing further details of the evaporator of FIG. 3.

In FIG. 7 I have shown further details of the evaporating heat exchanger 1 including its manifold 16 communicating with a pair of tubes from the outermost arrays 12c and 12d. Tube 12c is shown provided, at its junction with manifold 16, with a sill 17 extending radially inwardly from its inner peripheral wall, the height of the sill being a small fraction of the tube radius. The sills 17, which are present on all the tubes 12 except the outermost tubes 12d, confine a small quantity of condensate within these tubes in the form of a thin film 50 which spreads along the radially outward portion of the inner wall in response to the centrifugal force generated by the heat exchanger as soon as it is set in rotation by the starting motor. Whatever hot gases are led to the evaporator from the burner 91, 91a, the film 50 is instantly vaporized so that engine power is immediately available.

In this connection it may be noted that at high loads, e.g., upon the starting of the vehicle from standstill, the low absolute speed of the magnetically coupled shafts 21 and 81 results in a higher speed of the counterrotating unit 1 – 4 whereby the heat-exchanging effect of evaporator 1 is enhanced and evaporation of the working fluid is intensified. Thus, the system of my invention automatically adjusts itself to varying load conditions and delivers the full torque even at low and zero speed. This eliminates the need for the usual clutch or hydraulic torque converter. It also enables a simplification of the planetary-gear transmission 7 which need not provide for more than two speed ratios ("low" and "high"), instead of the customary three or four, besides allowing to put the vehicle into reverse as is well known per se.

FIG. 7 further illustrates the accumulation, during operation, of a pool of liquid in an annular trough 16a, along the periphery of manifold or header 16, this liquid separating centrifugally into an outer layer of heavier lubricating oil and an inner layer of condensate floating on the oil layer. The trough 16a is sufficiently recessed with reference to the outermost tubes 12d to allow only the condensate to enter these tubes; a pipe 51 opens into the oil layer and recirculates lubricant to the shaft bearings within housing 4 by means of a pump 52 (see also FIG. 2). The pipe 51 is thermally insulated at 51a within manifold 16.

Figure 8:
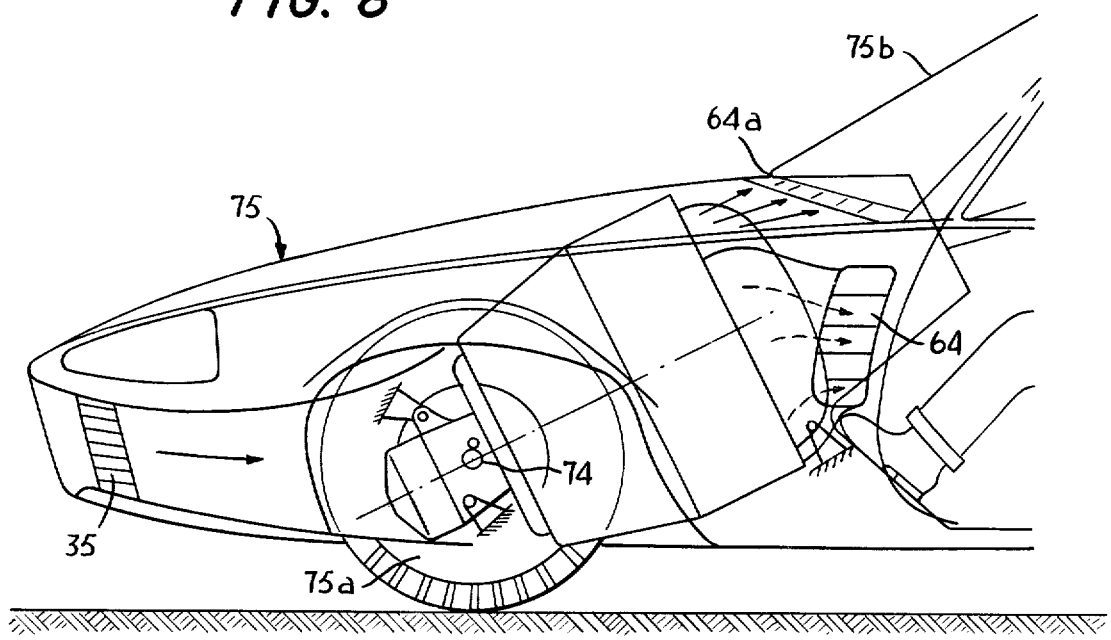
FIG. 8 is a somewhat diagrammatic side view of the fore section of an automotive vehicle equipped with a power plant according to my invention.
Figure 9:
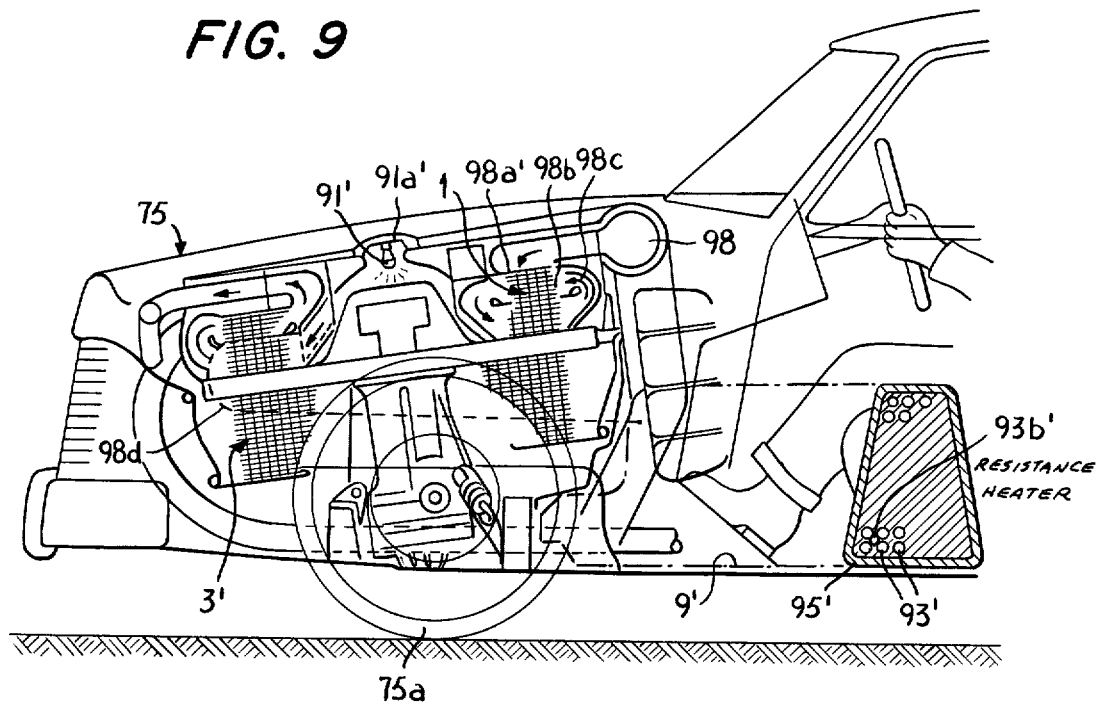
FIG. 9 is a view similar to FIG. 8 but with parts of the vehicle body broken away to show details of a modified plant.

In FIGS. 8 and 9 I have shown the fore section of an automotive vehicle 75, specifically a passenger car, with front wheels 75a driven by the output shaft 74 of transmission 7 (FIG. 1). The intake 35 for the condenser air is located at the front end of the vehicle and is in the form of a forwardly facing port, or of a pair of such ports on opposite sides. The outlet 64 for the hot air and combustion gases opens rearwardly on the side of the vehicle body, yet a separate outlet 64a for the condenser air alone is provided at the foot of the windshield 75b of the vehicle which can therefore be swept by this heated flow for defogging or defrosting purposes. A driver-operated switch, not shown, may direct the entire flow through the port 64. The ports 35 and 64 should be so dimensioned that, under normal driving conditions, the components of the entrance and exit velocities of their respective fluid streams in the direction of motion are substantially equal to the vehicle speed in order to increase the operating efficiency of the system.

In FIG. 9 I have shown the vehicle 75 equipped with a modified power plant according to my invention, which has a rotary evaporator 1' and condenser 3' centered on a nearly vertical axis. An associated primary heat store 9', of larger volume and capacity than the corresponding unit 9 of the preceding embodiment, extends partly between and partly beneath the seats in the interior of the vehicle. This heat store, consisting essentially of a superinsulation shell 95' and tubular containers 93' for the fusible mass, communicates with a manifold 98 which opens from above into a multiplicity of axially extending tubes 98a interconnected by annular ribs 98b. Unit 98a, 98b constitutes a stationary heat exchanger which adjoins the rotary heat exchanger 1' and is enshrouded by a toroidal channel 98c forming part of the rotating unit. Manifold 98 forms part of a closed path for the circulation of a vaporizable heat carrier such as sodium through the heat store 9'; this includes a conduit 98d for the return of condensate from the lower ends of tubes 98a to the heat store. With the condensate able to descend by gravity, as shown, a pump may be dispensed with. Air moving radially outwardly through the rotary evaporator 1' within channel 98c traverses the stationary heat exchanger 98a, 98b in a toroidal flow, as indicated by the arrows, to transfer the latent heat of the sodium vapors (boiling point 880°C) to the working fluid in the rotating unit which may be potassium (boiling point 760°C). A burner 91' is used, as described above, to generate combustion heat whenever driving conditions permit or require the burning of fuel, its air supply being controllable via a valve 91a'. The heat store 9' may be electrically recharged as described above, with the aid of resistance heaters 93b' in the form of rod-shaped elements each contacting four adjoining containers 93'.

Figure 10:
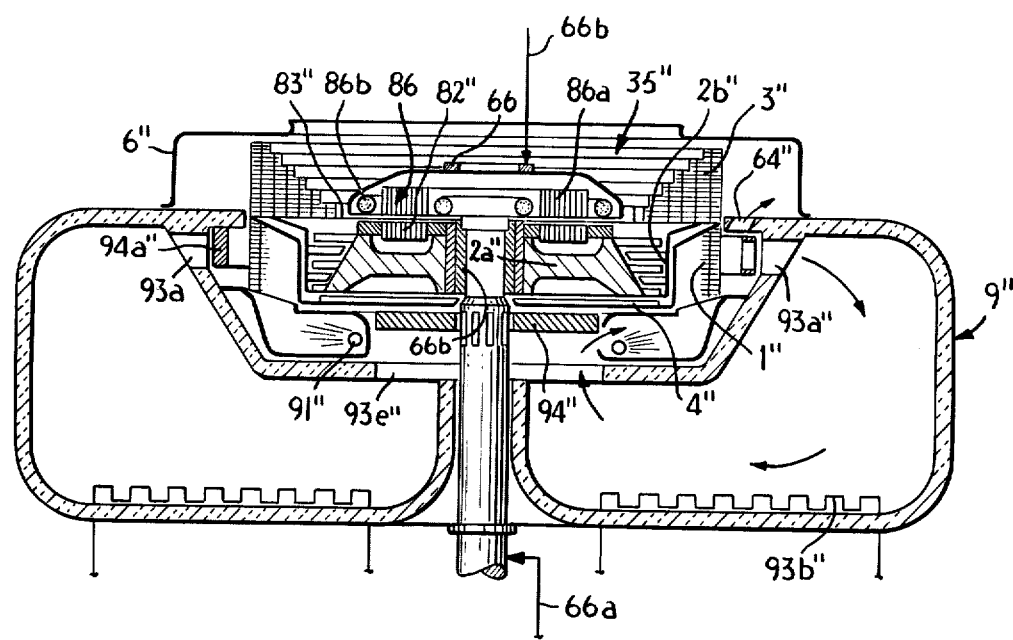
FIG. 10 is an enlarged axial sectional view of a power plant similar to that shown in FIG. 8.

FIG. 10 shows details of a power plant similar to that illustrated in FIG. 9, except that the heat store 9' has been replaced by a unit 9'' of toroidal configuration coaxial with heat exchangers 1'' and 3''; the containers for the active mass of this unit have not been illustrated, but resistors for thermally charging it have been shown at 93b''. An annular burner 91'', centered on the axis of the rotating unit, is mounted in a combustion chamber between the rotating housing 4'' of that unit and the heat store 9''. The combustion gases are exhausted by way of evaporator 1'' and one or more ports 64'' which open into a stationary casing 6'' surrounding the condenser 3''; the condenser air enters the casing at 35'' and leaves it, together with the exhaust gases, by a nonillustrated outlet.

The engine of the power plant shown in FIG. 10 is a turbine with a rotor 2a'' and a stator 2b'', the latter being rigid with housing 4''. The rotor 2a'', journaled on an inward extension of housing shaft 41'', carries an annular array of magnet poles 82'' coacting, through a magnetically pervious housing wall 32'', with an armature 86a of a field winding 86b of an electric-current generator 86 whose output drives the traction wheels of a vehicle or some other load to be powered by the system. The shaft 41'' of the output voltage of generator 86 is developed across a pair of leads 66a, 66b contacting the shaft 41'' and an insulated slip ring 66 on the generator casing.

The circulation of combustion air through the storage unit is regulated by an axially shiftable disk 94'', overlying a central exit port 93e'', and by a rotatable ring 94a'' having apertures alignable with respective entrance ports 93a''. The axial displacement of disk 94'' and the rotation of the ring 94a'' axial displacement of disk 94'' and the rotation of the ring 94a'' about the axis is controlled by nonillustrated linkages or servomotors.

Figure 12:
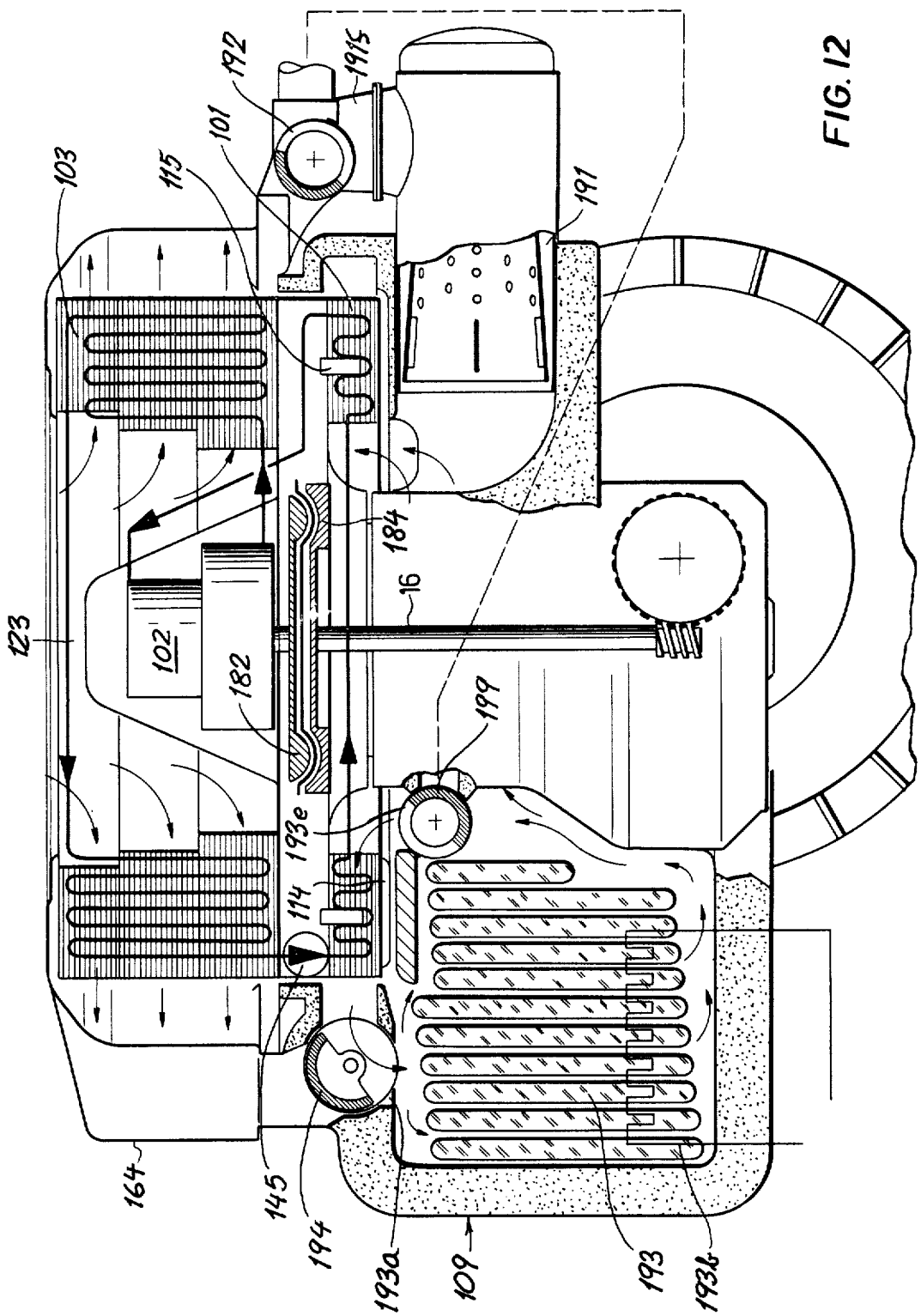
FIG. 12 is a view similar to FIG. 11, illustrating a second operating position.
Figure 13:
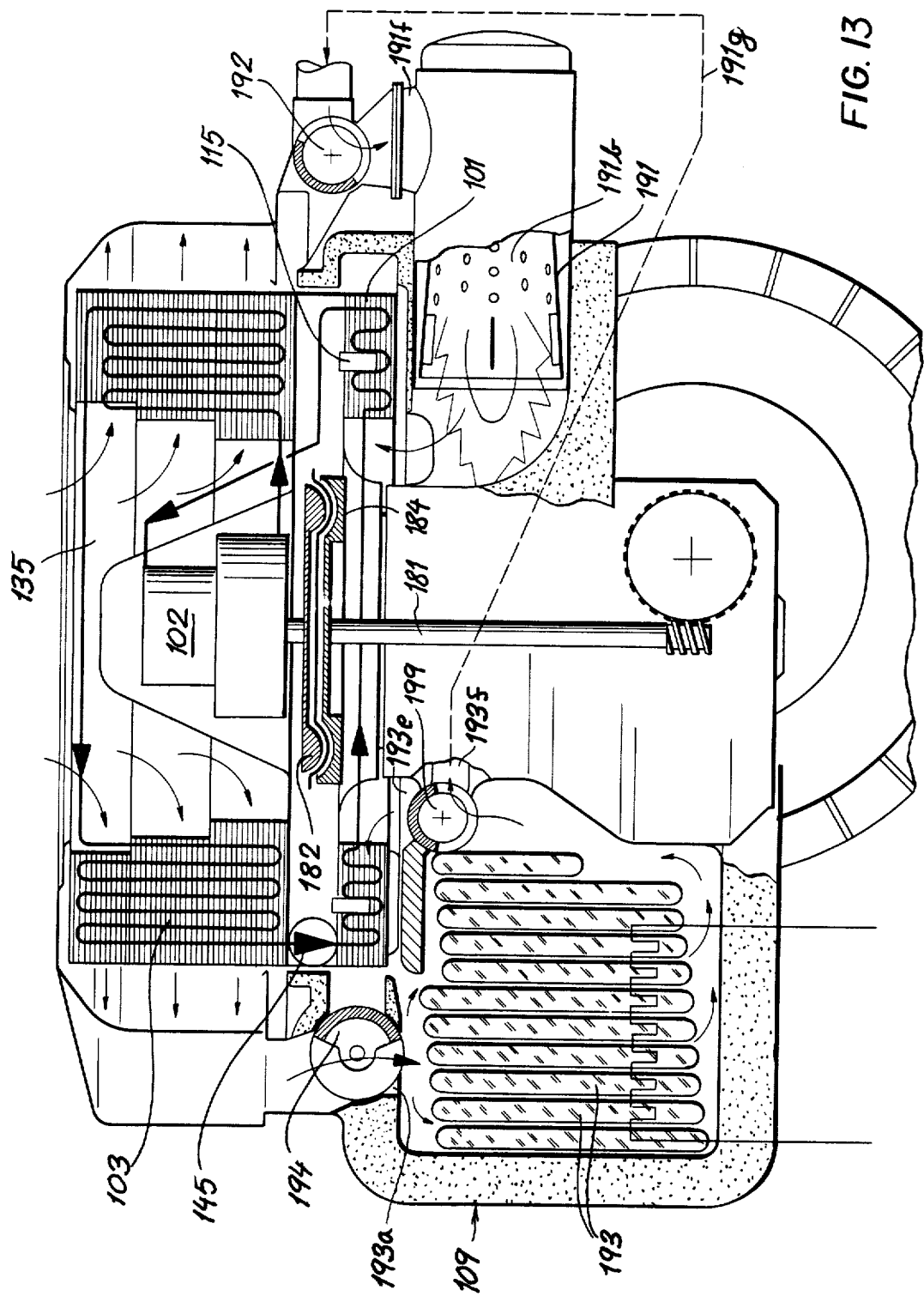
FIG. 13 is another view similar to FIG. 7, illustrating a third operating position.

Reference will now be made to FIGS. 11 – 13 for a description of still another power plant embodying the features of my invention discussed above. This power plant comprises a rotary evaporator 101 and a rotary condenser 103 traversed by a working fluid in a closed circuit 123 that is again hermetically sealed against the atmosphere by a housing 104 which includes a magnetically pervious wall section 183. An engine 102, whose stator or frame is rigid with the housing as described in connection with the first embodiment, has a shaft 121 carrying a rotor in the form of an annular array of magnet poles 182; coacting poles of an armature 184 are mounted on an output shaft 181 which drives a vehicular traction wheel 175a a transmission 107. Circuit 123 includes a condensate pump 145 as well as a set of secondary heat stores 115, the latter being disposed within evaporator 101.

A stationary casing 106 surrounds the condenser 103 and forms an air intake 135 for same; it also forms an annular duct about the condenser, this duct being provided with a tangential outlet 164. An extension 106a of casing 106 has an oppositely facing outlet 164a through which a part of the heated condenser air can reach an intake 191f of a combustion chamber 191b in a burner 191. Air intake 191f can be cut off by means of a valve 192.

A primary heat store 109 comprises an insulating shell 195 surrounding a set of containers 193 as described above; unit 109 can be electrically charged by means of a set of resistance heaters 193b which have been illustrated only diagrammatically. Insulation 195 preferably comprises a double jacket enclosing an evacuated space occupied by loose packing which may be constituted, for example, by small spheres or pellets of glass or similar material of low heat conductivity. In order to preserve a hard vacuum in the interstices between these bodies, a getter cartridge 195a is inserted in that space and is activatable by a current source 195b under the control of a thermostat 195c whenever the outer wall surface of insulation 195 surpasses a certain temperature level. The getter 195a should have a special affinity for gases liable to evolve under that within the insulation, such as water vapor and nitrogen, which are to be bound physically and chemically to its substance. in this way, it is possible to maintain within the enclosure of mean free molecular path whose length is substantially greater than the average spacing of the particles of the packing, thereby giving rise to the well-known Knudsen effect. This type of thermal superinsulation is, of course, also suitable for the corresponding heat-storage units of the preceding embodiments.

Figure 14:
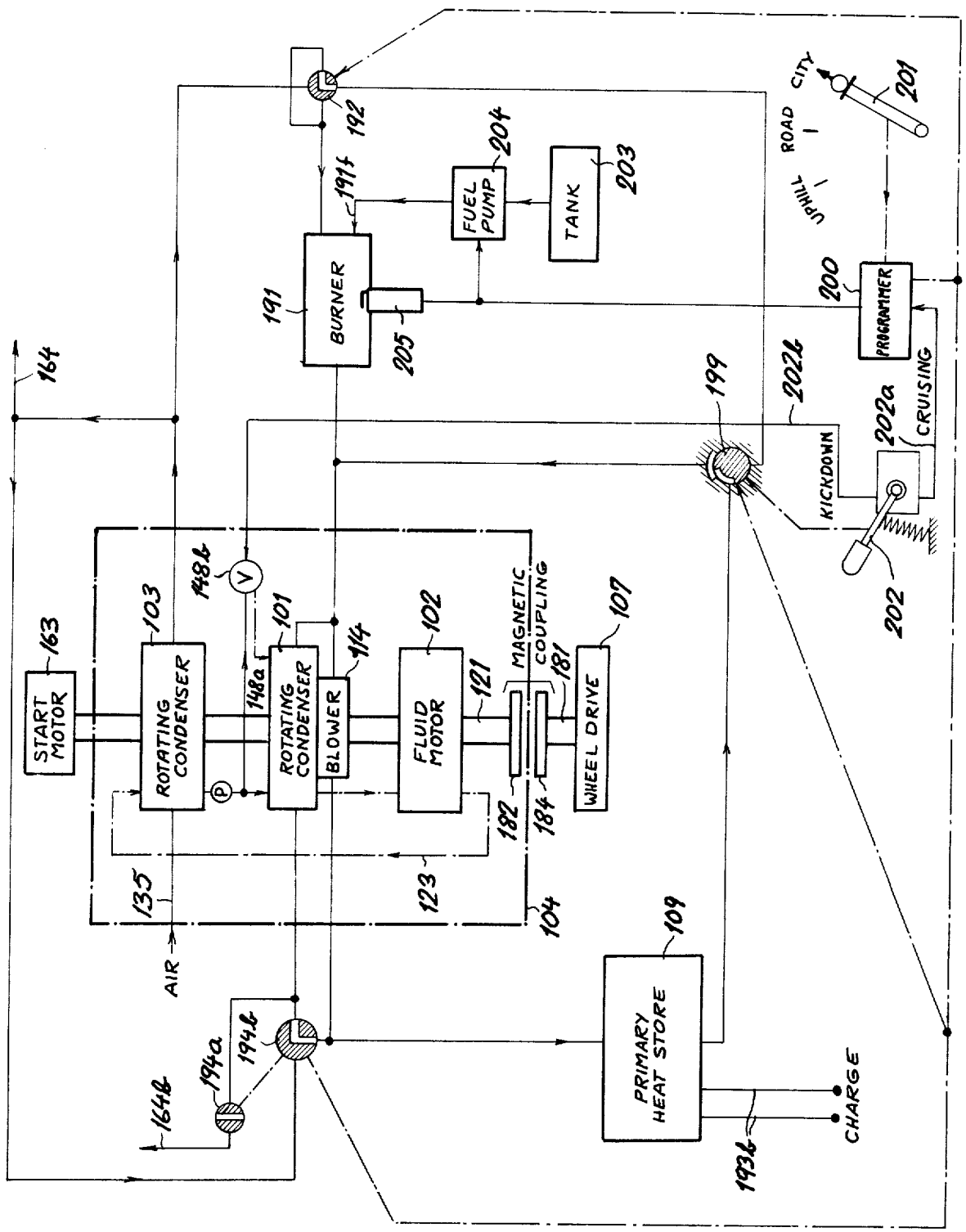
FIG. 14 is a diagrammatic representation of the system of FIGS. 11 – 13.

Rotary evaporator 101 carries a set of impeller blades 114 which, as explained above, serve to direct an uncooled fraction of the combustion gases into the interior of heat store 109 independently of the position of a valve 194 which under normal operating conditions (i.e., with burner 191 ignited) unblocks a port 111a for the escape of the spent combustion gases into the atmosphere by way of outlet 164. Valve 194 actually consists of two ganged valve members 194a, 194b, as shown in FIG. 14 more fully discussed hereinafter, valve member 194a controlling the escape of the combustion air; valve member 194b selectively blocks or unblocks an entrance port 193a to store 109. The latter also has a pair of exit ports 193e, 193f controlled by a further valve 199.

The position of FIG. 11 corresponds essentially to that of FIG. 1, except that the air entering the burner 191 at intake 191f does not come directly from the atmosphere but is part of the preheated air leaving the rotating condenser 103. The combustion gases pass radially outwardly through the evaporator 101 and, after vaporizing the working fluid in circuit 123, escape from the surrounding space via port 111a. A fraction of these hot gases, controllable by adjustment of valve 199, circulates through storage unit 109 to keep it fully charged, this fraction, exiting via port 193e, again mingles with the main gas flow coming from the combustion chamber 191b.

FIG. 12 shows the same system in an alternate position, corresponding to that of FIG. 2, in which burner 191 is cut off with closure of its air intake 191f by valve 192. All the air conveyed by evaporator 101 now passes via ports 193a and 193e through the storage unit 109, valve 194 cutting off the escape of any of this air to outlet 164. Thus, the engine now runs on the latent heat stored in containers 193.

FIG. 13 shows a third switching position in which the air intake 191f of burner 191 is cut off, as in FIG. 12, by the valve 192. Valve 194 now blocks the port 193e but opens the port 193f through which heated air from storage unit 109 can reach the intake 191f through a connection 191g. Valve 194 admits part of the heated condenser air from outlet 164 into storage unit 109 while letting the exhaust gases from evaporator 101 escape into the atmosphere at a location 164b (FIG. 14) sufficiently offset from entrance port 193a to prevent any substantial recirculation of combustion gases via connection 191g to the burner 191. Thus, storage unit 109 and burner 191 are now connected in tandem so that air aspirated into condenser inlet 135 is successively heated in heat exchanger 103 and storage elements 193 before reaching the combustion chamber 191b, thereby manually increasing the available vapor pressure and the resulting engine torque.

Reference will now be made to FIG. 14 in which the components of FIGS. 11 – 13 and related elements have been illustrated diagrammatically. Elements not shown in the preceding three Figures include a programmer 200, a shift lever 201, a spring-loaded gas pedal 202, a fuel tank 203, a fuel pump 204, and an igniter 205 such as a spark plug. There is further shown a start motor 163 corresponding in part to the winding 63 of FIG. 1. Lever 201 has three shift positions respectively labeled CITY, ROAD and UPHILL. Through the programmer 200, this lever controls the valves 192, 194a and 199 to establish the switching positions of FIGS. 11 (ROAD), 12 (CITY) and 13 (UPHILL) in conformity with existing driving conditions. In the illustrated CITY position, the aforementioned valves function as in FIG. 12 to connect the heat store in a closed circuit with evaporator 101 while cutting off the air and fuel supply to burner 191; the rate of air circulation can be regulated by the valve 199 under the control of accelerator pedal 202.

Upon a shifting of lever 201 from CITY into either of its alternate positions, igniter 205 is energized to activate the burner 191. However, in position ROAD the valve setting of FIG. 11 is continuously maintained only as long as the pedal 202 is substantially fully depressed, indicating a condition of maximum or near-maximum load. With lower loads, i.e., during cruising, a signal on a lead 202a informs the programmer that continuous burning of fuel is not required; the programmer thereupon alternates between the positions of FIGS. 11 and 12, with periodical activation of the burner, in a rhythm depending on the degree of loading as determined by the pedal position and possibly by other parameters such as the speed of the vehicle.

In the UPHILL position, extra power may be generated by stepping hard on the pedal, into the so-called "kick-down" position, to energize a lead 202$b$ which opens a valve 148$b$ for the admission of some condensate to the secondary heat stores 115 (FIGS. 11 – 13) of evaporator 101 via a conduit 148$a$.

Figure 15:
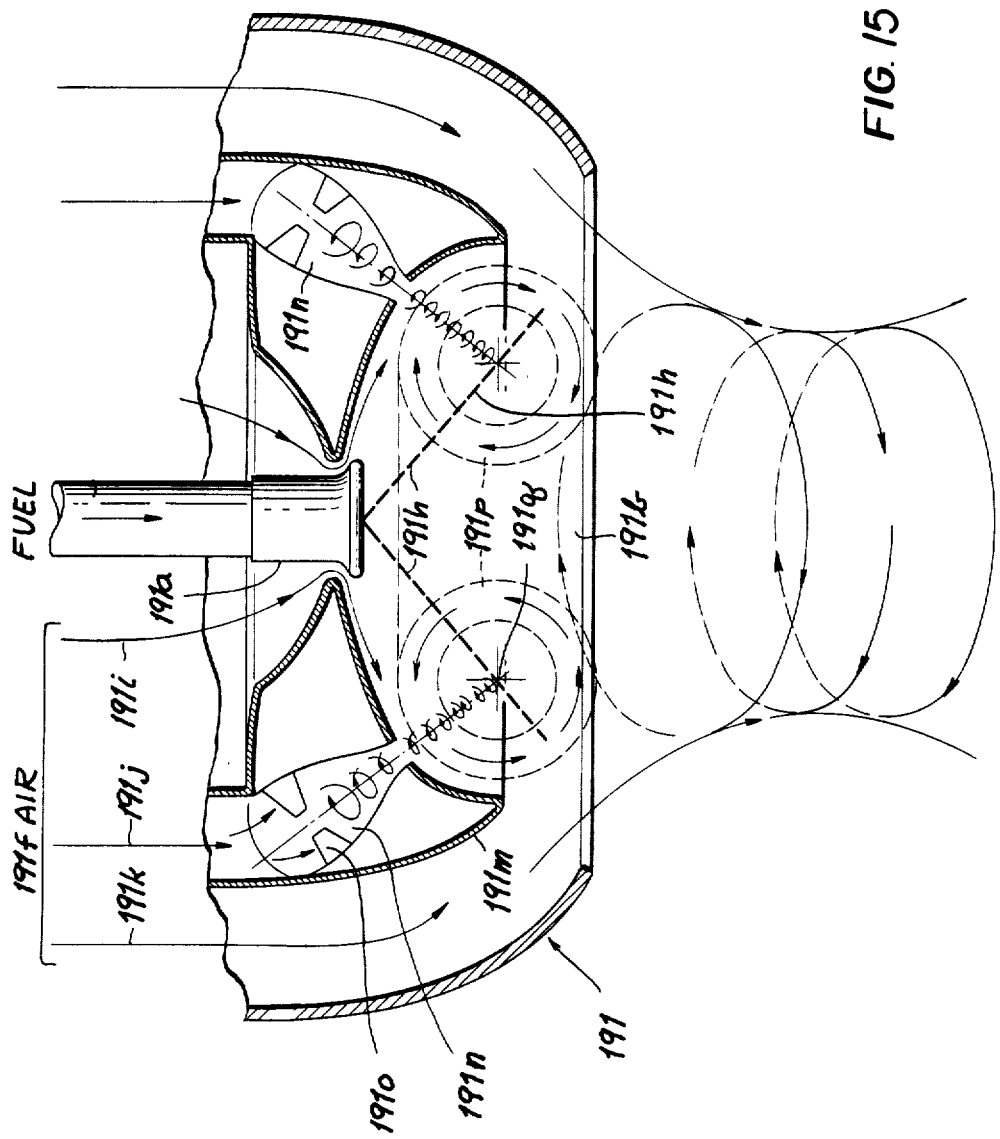
FIG. 15 is an axial sectional view of a vortex chamber forming part of a burner for a power plant according to my invention.

In FIG. 15 I have shown a particularly effective construction for burner 191. The housing of this burner forms a vortex chamber 191$b$ into which its nozzle 191$a$ admits a conical spray 191$h$ of atomized fuel. Air from inlet 191$f$ divides into a primary flow 191$i$ around nozzle 191$a$, a secondary flow 191$j$ through a plurality of lateral channels 191$n$, and a tertiary flow 191$k$ in an outer peripheral channel bounded by the housing 191 and by a toroidal insert 191$m$. The lateral channels 191$n$ for the secondary flow 191$j$ pass through the insert 191$m$ and are provided with baffles 191$o$ imparting a twist to the entering air. The swirling air stream thus generated in each channel 191$n$ is centered on an axis which is skew to the central axis of the burner and which sets the primary air 191$i$ in toroidal motion as indicated at 191$p$, the toroidal air flow rotating about its own centerline 191$g$ while also revolving around the burner axis. The generatrices of spray cone 191$h$ pass substantially through centerline 191$g$ whereby the injected fuel particles are caused to mingle intimately with the air to form a stoichiometric mixture consumed by a flame which is maintained for longer or shorter intervals, under the control of the programmer 200 of FIG. 14, and which is regenerated after each extinction by the igniter 205 not shown in FIG. 15. The tertiary air 191$k$ helps maintain the rotation of the toroidal vortex 191$p$ about its centerline and ensures complete oxidation of any residual carbon monoxide, this tertiary air passing through a region of less intense heat so as to avoid undesirable reactions between its excess oxygen and the nitrogen present in the chamber.

Figure 16:
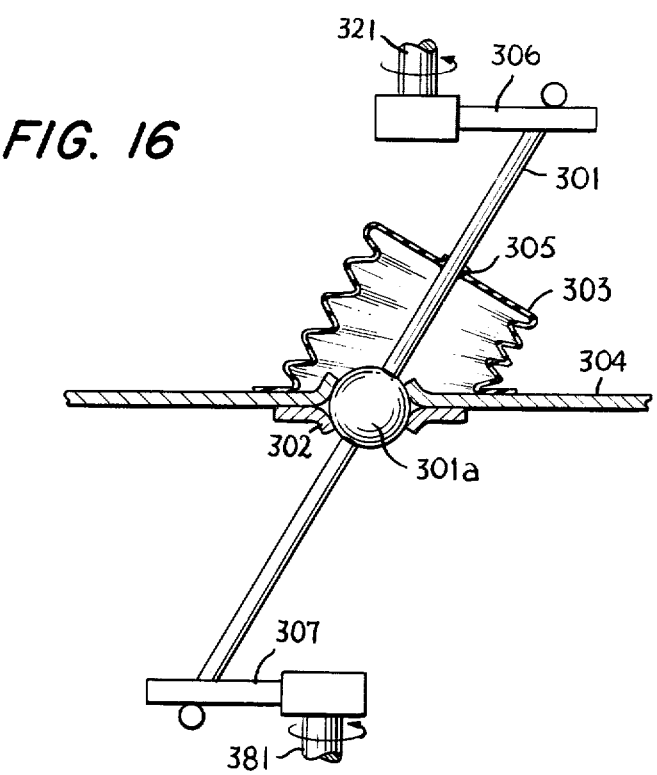
FIGS. 16 and 17 are detail views of mechanical couplings adapted to be used in the preceding embodiments in lieu of the magnetic couplings illustrated therein.
Figure 17:
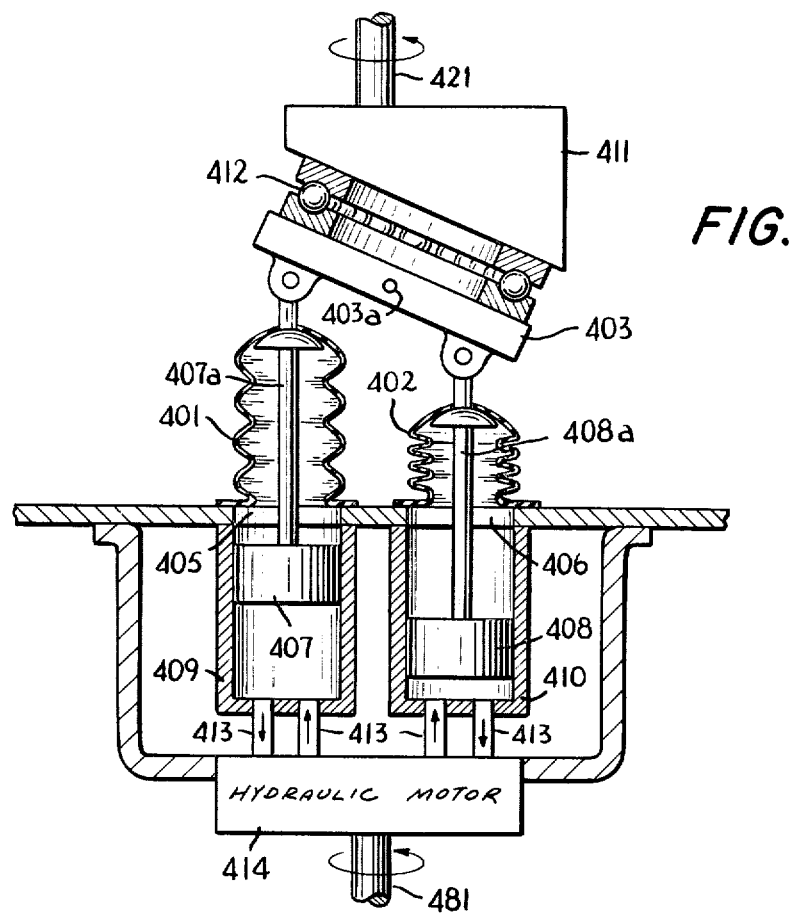

In FIGS. 16 and 17 I have shown ways of transmitting torque through a wall of a hermetically sealed housing without a magnetic coupling. In FIG. 16 an engine shaft 321 is mechanically coupled with an output shaft 381 through a linkage comprising a lever 301 whose midpoint is spherically enlarged at 301$a$ and seated in a gap 302 of a housing wall 304. This gap is bridged by a bellows 303 which is soldered to lever 301 at 305 and which deforms sufficiently to let the lever rock about the common axis of shafts 321 and 381 (which also passes through the center of sphere 301$a$) without rotating about its own axis. One end of the lever is engaged by a slotted end of an arm 306 rigid with shaft 321, its other end being similarly engaged by an arm 307 rigid with shaft 381. Thus, the two shafts are constrained to rotate in unison, bellows 303 gyrating about their axis together with lever 301.

The system of FIG. 17 has a pair of bellows 401, 402 bridging gaps 405, 406 in a housing wall 404, the bellows being penetrated in fluidtight relationship by rods 407$a$, 408$a$ of a pair of pistons 407, 408 received in two hydraulic cylinders 409, 410. The projecting ends of the piston rods are linked to a swash plate 403 confronting a circular wedge 411 which is rigid with engine shaft 421 and acts upon the swash plate 403 through a ball bearing 412. Pistons 407 and 408 are reciprocated in mutual phase opposition by the oscillating swash plate 403 which has a fixed fulcrum at 403$a$. These pistons act upon a hydraulic fluid in cylinders 409 and 410, the fluid being unidirectionally circulated via conduits 413 and nonillustrated check valves through a hydraulic motor 414 driving an output shaft 481.

Figure 18:
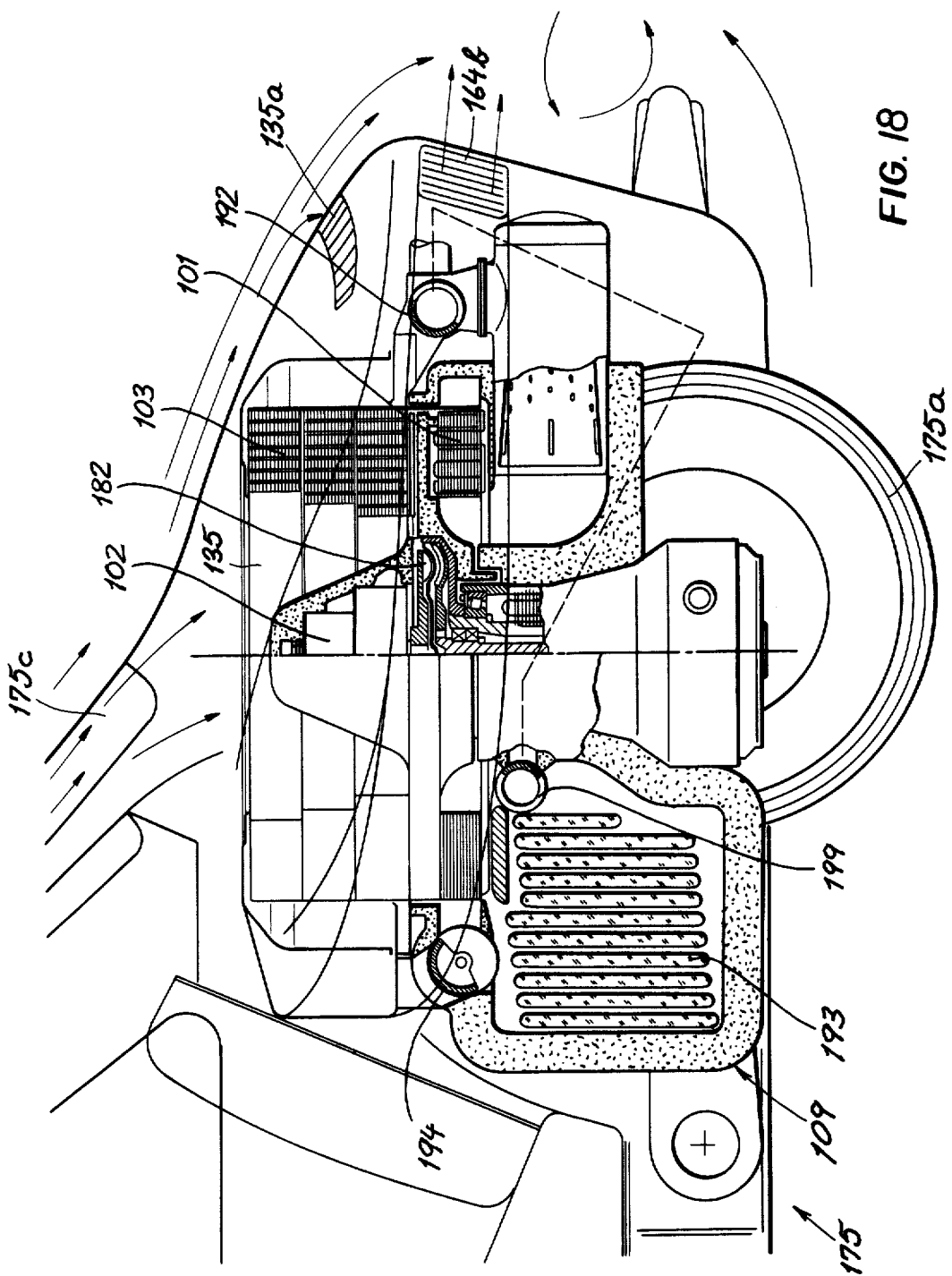
FIG. 18 is a view generally similar to FIG. 8, showing the aft section of an automotive vehicle with the power plant of FIGS. 11 – 13 installed therein.

FIG. 18 depicts the aft section of a vehicle 175 equipped with the power plant of FIGS. 11 – 13. The fresh-air inlet 135 is shown disposed underneath the rear window 175$c$ of the vehicle to help prevent the detachment of a boundary layer of ambient air from the vehicular surface, thereby reducing the air resistance encountered by the car. Exit port 164$b$ is disposed at the rear of the vehicle. Again, the inlet and outlet ports are advantageously so dimensioned that the velocity components of the aspirated and expelled air streams in the direction of vehicle motion approximately equals the speed of the car under normal operating conditions.

The adhesion of the boundary layer to the sloping rear surface of the vehicle body may be further improved by the provision of an ancillary inlet port 135$a$ communicating directly with the outlet 164$b$, the air entering the port 135$a$ serving to cool the exhaust gases exiting from port 164$b$.

I claim:

1. A power plant for an automotive vehicle having a traction wheel provided with a drive shaft, comprising:
    an engine adapted to be driven by the pressure of an expanding working fluid;
    heat-exchanger means fluidically linked with said engine;
    first conduit means for conducting said working fluid in a closed circuit through said engine and said heat-exchanger means;
    second conduit means for conducting an external heat carrier through said heat-exchanger means in thermally interacting relationship with said working fluid whereby the latter absorbs heat from said carrier upstream of said engine and gives up heat to the environment downstream of said engine;
    combustion means outside said closed circuit operable to heat said carrier prior to entry thereof into said heat-exchanger means;
    heat-storage means outside said closed circuit for heating said carrier prior to entry thereof into said heat-exchanger means in an inoperative state of said combustion means;
    switchover means having a first and a second operating position for alternately making said combustion means and said heat-storage means effective to heat said carrier; and
    transmission means for operatively coupling said engine to said drive shaft.

2. A power plant as defined in claim 1 wherein said working fluid is vaporizable, said heat-exchanger means including a condenser downstream of said engine and an evaporator upstream of said engine.

3. A power plant as defined in claim 2 wherein said second conduit means includes a channel leading from said combustion means to said evaporator for subjecting same to hot combustion gases, said channel having a branch extending to said heat-storage means, said switchover means including blocking means for said branch ineffectual in said first position for admitting part of the hot combustion gases into said heat-storage means to recharge same.

4. A power plant as defined in claim 3 wherein said combustion means comprises a burner provided with an air inlet, said condenser having an air intake open to the atmosphere and further having a discharge duct for atmospheric air heated by the condensing working fluid, said duct communicating with said air inlet in said first operating position and being disconnected therefrom in said second operating position, said branch being part of a closed path for air circulating through said evaporator and said heat-storage means in said second operating position.

5. A power plant as defined in claim 4 wherein said switchover means has a third operating position establishing a connection from said heat-storage means to said air inlet for delivering preheated combustion air to said burner, said blocking means being effective in said third operating position to prevent the entry of combustion gases into said heat-storage means.

6. A power plant as defined in claim 5 wherein said connection extends from said duct to said heat-exchanger means and thence through said branch to said air inlet.

7. A power plant as defined in claim 2 wherein said condenser and evaporator are a pair of rigidly interconnected radial blowers centered on a common axis of rotation, each of said blowers including a set of tubes extending substantially parallel to said axis.

8. A power plant as defined in claim 7 wherein certain tubes of said evaporator are provided along their radially outward inner peripheral surfaces with inwardly projecting sills, of a height substantially less than the tube radius, for confining a thin film of liquefied working fluid from said condenser along said peripheral surfaces.

9. A power plant as defined in claim 8 wherein said evaporator is provided with condensate-injection means extending axially into said certain tubes past the sills thereof.

10. A power plant as defined in claim 7 wherein a group of radially outlying tubes of said evaporator communicate with an inner peripheral trough connected to said condenser for receiving a mixture of liquefied working fluid and a higher-boiling lubricant therefrom, further comprising recirculation means for lubricant collecting in said trough upon evaporation of the accompanying condensate in said outlying tubes.

11. A power plant as defined in claim 1, further comprising programming means responsive to fractional loading of the engine for alternately activating and deactivating said combustion means with simultaneous alternation of said switchover means between said first and second operating positions in a rhythm depending upon the degree of fractional loading.

12. A power plant as defined in claim 11 wherein said engine is a drive motor for an automotive vehicle provided with accelerator means, said programming means being controlled by said accelerator means.

13. A power plant as defined in claim 1 wherein said transmission means forms part of an automotive vehicle provided with a body enclosing said heat-exchanger means, said body having ports communicating with said second conduit means for passing atmospheric air through said heat-exchanger means in a generally rearward direction with reference to the vehicle.

14. A power plant as defined in claim 13 wherein said vehicle is provided with several rows of seats in its interior, said heat-exchanger means being at least partly disposed in said interior between said rows of seats.

15. A power plant as defined in claim 13 wherein said engine is disposed in a fore section of said body provided with an inclined windshield, said ports including at least one outlet port positioned adjacent said windshield for driving heated air across the outer surface thereof.

16. A power plant as defined in claim 13 wherein said engine is disposed in an aft section of said body provided with a sloping rear surface, said ports including at least one inlet port positioned adjacent said rear surface for helping maintain a boundary layer of air in contact therewith.

17. A power plant as defined in claim 13 wherein said body is provided with rearwardly facing outlet ports for the discharge of spent cooling air and combustion gases.

18. A power plant as defined in claim 1 wherein said working fluid is vaporizable and said heat-storage means comprises a reservoir containing a mass of a fusible material having a freezing point above the boiling point of said working fluid.

19. A power plant as defined in claim 18 wherein said reservoir is provided with a double-walled enclosure confining an evacuated space, said space being filled with a thermally insulating packing forming interconnected voids dimensioned to give rise to the Knudsen effect.

20. A power plant as defined in claim 19, further comprising getter means with an affinity for evolving gases from said packing communicating with said evacuated space and thermostatically controlled activating means for said getter means responsive to an increase in the temperature of the outer wall surface of said enclosure beyond a predetermined maximum.

21. A power plant as defined in claim 18, further comprising ancillary electric preheating means for said mass in said reservoir.

22. A power plant as defined in claim 18 wherein said reservoir includes a multiplicity of containers for said mass spaced apart to provide passages for said carrier.

23. A power plant as defined in claim 18 wherein said heat-exchanger means includes an evaporator and a condenser, further comprising at least one receptacle in the path of said heat carrier containing a heat-storing compound with a freezing point above the boiling point of the working fluid, and valve means operable to admit working-fluid condensate from said condenser to said receptacle during a limited overload period and admixing the resulting vapors with those coming from said evaporator upstream of said engine.

24. A power plant as defined in claim 23 wherein said evaporator comprises a rotating structure with several annular arrays of tubes centered on a common axis of rotation, said heat carrier flowing generally radially outwardly from said axis past said tubes, said receptacle being disposed between an inner and an outer array of tubes and being shielded by said inner array from the oncoming heat carrier.

25. A power plant as defined in claim 23 wherein said condenser is provided with an ancillary heat sink activable during overload periods.

26. A power plant as defined in claim 25 wherein said condenser comprises a rotating structure with an array of axially extending tubes and with heat-conductive annular ribs physically interconnecting said tubes, said ancillary heat sink comprising irrigation means for said ribs.

27. A power plant as defined in claim 25 wherein said ancillary heat sink comprises a store of normally solid fusible material disposed in contact with a condenser surface.

28. A power plant as defined in claim 18 wherein said heat-exchanger means includes a rotary evaporator, further comprising a stationary heat exchanger juxtaposed with said evaporator and communicating with said reservoir in a closed path for an ancillary heat carrier, said rotary evaporator generating a circulating air stream through said stationary heat exchanger for transferring heat from said ancillary heat carrier to said working fluid in said second operating position.

29. A power plant as defined in claim 1, further comprising a rotatable housing rigid with said heat-exchanger means hermetically sealing said closed circuit against the outside, said engine being disposed inside said housing and being operatively coupled with said transmission means through an imperforate but energy-transmissive wall portion of said housing.

30. A power plant as defined in claim 29 wherein said wall portion is magnetically pervious, said engine being operatively coupled with said transmission means through a magnetic flux.

31. A power plant as defined in claim 29 wherein said wall portion is physically deformable, said engine being operatively coupled with said transmission means through mechanically coacting elements.

32. A power plant as defined in claim 1 wherein said combustion means comprises a vortex chamber centered on an axis, a primary air inlet centrally of said chamber, at least one secondary air inlet provided with twist-imparting means for injecting a swirling air flow into said chamber in a direction skew to said axis to generate jointly with said primary air inlet a toroidal flow centered on said axis and rotating about its own centerline, and nozzle means for the injection of atomized fuel in a substantially conical spray centered on said axis with generatrices passing through said toroidal flow in the vicinity of said centerline.

33. A power plant as defined in claim 32 wherein said chamber is further provided with a tertiary air inlet for guiding an annular air flow generally parallel to said axis past the outer periphery of said toroidal flow in a direction tending to accelerate its rotation about said centerline.

34. A power plant comprising:
an engine adapted to be driven by the pressure of an expanding vaporizable working fluid;
heat-exchanger means fluidically linked with said engine, said heat-exchanger means including an evaporator upstream of said engine and a condenser downstream of said engine;
first conduit means for conducting said working fluid in a closed circuit through said engine and said heat-exchanger means;
second conduit means for conducting an external heat carrier through said heat-exchanger means in thermally interacting relationship with said working fluid whereby the latter absorbs heat from said carrier in said evaporator and gives up heat to the environment in said condenser;
a receptacle in the path of said carrier containing a heat-storing compound with a freezing point above the boiling point of said working fluid;
valve means operable to admit working-fluid condensate from said condenser to said receptacle during a limited overload period and admixing the resulting vapors with those coming from said evaporator;
combustion means outside said closed circuit operable to heat said carrier prior to entry thereof into said heat-exchanger means;
heat-storage means outside said closed circuit for heating said carrier prior to entry thereof into said heat-exchanger means in an inoperative state of said combustion means, said heat-storage means comprising a reservoir containing a mass of a fusible material having a freezing point above the boiling point of said working fluid;
switchover means having a first and a second operating position for alternately making said combustion means and said heat-storage means effective to heat said carrier; and
transmission means for operatively coupling said engine to a load.

35. A power plant as defined in claim 34 wherein said evaporator comprises a rotating structure with several annular arrays of tubes centered on a common axis of rotation, said heat carrier flowing generally radially outwardly from said axis past said tubes, said receptacle being disposed between an inner and an outer array of tubes and being shielded by said inner array from the oncoming heat carrier.

36. A power plant as defined in claim 34 wherein said condenser is provided with an ancillary heat sink activable during overload periods.

37. A power plant as defined in claim 36 wherein said condenser comprises a rotating structure with an array of axially extending tubes and with heat-conductive annular ribs physically interconnecting said tubes, said ancillary heat sink comprising irrigation means for said ribs.

38. A power plant as defined in claim 36 wherein said ancillary heat sink comprises a store of normally solid fusible material disposed in contact with a condenser surface.

39. A power plant comprising:
an engine adapted to be driven by the pressure of an expanding vaporizable working fluid;
heat-exchanger means fluidically linked with said engine, said heat-exchanger means including a rotary evaporator upstream of said engine and a condenser downstream of said engine;
first conduit means for conducting said working fluid in a closed circuit through said engine and said heat-exchanger means;
second conduit means for conducting an external heat carrier through said heat-exchanger means in thermally interacting relationship with said working fluid whereby the latter absorbs heat from said carrier in said rotary evaporator and gives up heat to the environment in said condenser;
combustion means outside said closed circuit operable to heat said carrier prior to entry thereof into said heat-exchanger means;
heat-storage means outside said closed circuit for heating said carrier prior to entry thereof into said heat-exchanger means in an inoperative state of said combustion means, said heat-storage means comprising a reservoir containing a mass of a fusible material having a freezing point above the boiling point of said working fluid;
a stationary heat exchanger juxtaposed with said evaporator and communicating with said reservoir in a closed path for an ancillary heat carrier, said rotary evaporator generating a circulating air stream through said stationary heat exchanger for transferring heat from said ancillary heat carrier to said working fluid in said second operating position;

switchover means having a first and a second operating position for alternately making said combustion means and said heat-storage means effective to heat said carrier; and transmission means for operatively coupling said engine to a load.

40. A power plant comprising:

an engine adapted to be driven by the pressure of an expanding working fluid;

heat-exchanger means fluidically linked with said engine;

first conduit means for conducting said working fluid in a closed circuit through said engine and said heat-exchanger means;

second conduit means for conducting an external heat carrier through said heat-exchanger means in thermally interacting relationship with said working fluid whereby the latter absorbs heat from said carrier upstream of said engine and gives up heat to the environment downstream of said engine;

combustion means outside said closed circuit operable to heat said carrier prior to entry thereof into said heat-exchanger means;

heat-storage means outside said closed circuit for heating said carrier prior to entry thereof into said heat-exchanger mean in an inoperative state of said combustion means;

switchover means having a first and a second operating position for alternately making said combustion means and said heat-storage means effective to heat said carrier;

transmission means for operatively coupling said engine to a load; and a rotatable housing rigid with said heat-exchanger means hermetically sealing said closed circuit against the outside, said engine being disposed inside said housing and being operatively coupled with said transmission means through an imperforate but energy-transmissive wall portion of said housing.

41. A power plant as defined in claim 40 wherein said wall portion is magnetically pervious, said engine being operatively coupled with said transmission means through a magnetic flux.

42. A power plant as defined in claim 40 wherein said wall portion is physically deformable, said engine being operatively coupled with said transmission means through mechanically coacting elements.

43. A power plant comprising:

an engine adapted to be driven by the pressure of an expanding working fluid;

heat-exchanger means fluidically linked with said engine;

first conduit means for conducting said working fluid in a closed circuit through said engine and said heat-exchanger means;

second conduit means for conducting an external heat carrier through said heat-exchanger means in thermally interacting relationship with said working fluid whereby the latter absorbs heat from said carrier upstream of said engine and gives up heat to the environment downstream of said engine;

combustion means outside said closed circuit operable to heat said carrier prior to entry thereof into said heat-exchanger means, said combustion means including a vortex chamber centered on an axis, a primary air inlet centrally of said chamber, at least one secondary air inlet provided with twist-imparting means for injecting a swirling air flow into said chamber in a direction skew to said axis to generate jointly with said primary air inlet a toroidal flow centered on said axis and rotating about its own centerline, and nozzle means for the injection of atomized fuel in a substantially conical spray centered on said axis with generatrices passing through said toroidal flow in the vicinity of said centerline;

heat-storage means outside said closed circuit for heating said carrier prior to entry thereof into said heat-exchanger means in an inoperative state of said combustion means;

switchover means having a first and a second operating position for alternately making said combustion means and said heat-storage means effective to heat said carrier; and transmission means for operatively coupling said engine to a load.

44. A power plant as defined in claim 43 wherein said twist-imparting means is adapted and positioned to set said toroidal flow in rotation around said axis.

45. A power plant as defined in claim 43 wherein said chamber is further provided with a tertiary air inlet for guiding an annular air flow generally parallel to said axis past the outer periphery of said toroidal flow in a direction tending to accelerate its rotation about said centerline.

46. A power plant for an automotive vehicle having a traction wheel provided with a drive shaft, comprising:

an engine adapted to be driven by the pressure of an expanding working fluid;

heat-exchanger means fluidically linked with said engine;

first conduit means for conducting said working fluid in a closed circuit through said engine and said heat-exchanger means;

second conduit means for conducting an external heat carrier through said heat-exchanger means in thermally interacting relationship with said working fluid whereby the latter absorbs heat from said carrier upstream of said engine and gives up heat to the environment downstream of said engine;

an external heat source operable to heat said carrier prior to entry thereof into said heat-exchanger means;

heat-storage means outside said closed circuit for heating said carrier prior to entry thereof into said heat-exchanger means in an inoperative state of said external heat source;

switchover means having a first and a second operating position for alternately making said external heat source and said heat-storage means effective to heat said carrier; and transmission means for operatively coupling said engine to said drive shaft.

47. A power plant comprising:

an engine adapted to be driven by the pressure of an expanding vaporizable working fluid;

heat-exchanger means fluidically linked with said engine, said heat-exchanger means including an evaporator upstream of said engine and a condenser downstream of said engine;

first conduit means for conducting said working fluid in a closed circuit through said engine and said heat-exchanger means;

second conduit means for conducting an external heat carrier through said heat-exchanger means in thermally interacting relationship with said working fluid whereby the latter absorbs heat from said carrier in said evaporator and gives up heat to the environment in said condenser;

a receptacle in the path of said carrier containing a heat-storing compound with a freezing point above the boiling point of said working fluid;

valve means operable to admit working-fluid condensate from said condenser to said receptacle during a limited overload period and admixing the resulting vapors with those coming from said evaporator;

an external heat source operable to heat said carrier prior to entry thereof into said heat-exchanger means;

heat-storage means outside said closed circuit for heating said carrier prior to entry thereof into said heat-exchanger means in an inoperative state of said external heat source, said heat-storage means comprising a reservoir containing a mass of a fusible material having a freezing point above the boiling point of said working fluid;

switchover means having a first and a second operating position for alternately making said external heat source and said heat-storage means effective to heat said carrier; and transmission means for operatively coupling said engine to a load.

48. A power plant comprising:

an engine adapted to be driven by the pressure of an expanding vaporizable working fluid;

heat-exchanger means fluidically linked with said engine, said heat-exchanger means including a rotary evaporator upstream of said engine and a condenser downstream of said engine;

first conduit means for conducting said working fluid in a closed circuit through said engine and said heat-exchanger means;

second conduit means for conducting an external heat carrier through said heat-exchanger means in thermally interacting relationship with said working fluid whereby the latter absorbs heat from said carrier in said evaporator and gives up heat to the environment in said condenser;

an external heat source operable to heat said carrier prior to entry thereof into said heat-exchanger means;

heat-storage means outside said closed circuit for heating said carrier prior to entry thereof into said heat-exchanger means in an inoperative state of said external heat source, said heat-storage means comprising a reservoir containing a mass of a fusible material having a freezing point above the boiling point of said working fluid;

a stationary heat exchanger juxtaposed with said evaporator and communicating with said reservoir in a closed path for an ancillary heat carrier, said rotary evaporator generating a circulating air stream through said stationary heat exchanger for transferring heat from said ancillary heat carrier to said working fluid in said second operating position;

switchover means having a first and a second operating position for alternately making said external heat source and said heat-storage means effective to heat said carrier; and transmission means for operatively coupling said engine to a load.

49. A power plant comprising:

an engine adapted to be driven by the pressure of an expanding working fluid;

heat-exchanger means fluidically linked with said engine;

first conduit means for conducting said working fluid in a closed circuit through said engine and said heat-exchanger means;

second conduit means for conducting an external heat carrier through said heat-exchanger means in thermally interacting relationship with said working fluid whereby the latter absorbs heat from said carrier upstream of said engine and gives up heat to the environment downstream of said engine;

an external heat source operable to heat said carrier prior to entry thereof into said heat-exchanger means;

heat-storage means outside said closed circuit for heating said carrier prior to entry thereof into said heat-exchanger means in an inoperative state of said external heat source;

switchover means having a first and a second operating position for alternately making said external heat source and said heat-storage means effective to heat said carrier;

transmission means for operatively coupling said engine to a load; and a rotatable housing rigid with said heat-exchanger means hermetically sealing said closed circuit against the outside, said engine being disposed inside said housing and being operatively coupled with said transmission means through an imperforate but energy-transmissive wall portion of said housing.

* * * * *